(12) United States Patent
Eo et al.

(10) Patent No.: US 8,932,173 B2
(45) Date of Patent: Jan. 13, 2015

(54) AUTOMATED MANUAL TRANSMISSION FOR VEHICLE

(71) Applicant: Hyundai Motor Company, Seoul (KR)

(72) Inventors: Soon Ki Eo, Ansan-si (KR); Dong Soo Lee, Seoul (KR); Jong Yun Park, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/030,594

(22) Filed: Sep. 18, 2013

(65) Prior Publication Data

US 2014/0371021 A1 Dec. 18, 2014

(30) Foreign Application Priority Data

Jun. 14, 2013 (KR) .................. 10-2013-0068169

(51) Int. Cl.
*F16H 57/10* (2006.01)
*F16H 3/44* (2006.01)

(52) U.S. Cl.
CPC ........................................ *F16H 3/44* (2013.01)
USPC .............. 475/271; 475/218; 475/330; 74/333

(58) Field of Classification Search
USPC ......... 475/207, 210, 218, 219, 221, 225, 269, 475/271, 284, 330; 74/331, 333, 329
See application file for complete search history.

(56) References Cited

U.S. PATENT DOCUMENTS

| | | | |
|---|---|---|---|
| 4,774,856 A * | 10/1988 | Hiraiwa | 475/285 |
| 6,575,866 B2 | 6/2003 | Bowen | |
| 6,716,126 B2 | 4/2004 | Bowen | |
| 7,857,726 B2 * | 12/2010 | Borgerson | 475/311 |
| 8,038,568 B2 * | 10/2011 | Wittkopp et al. | 475/302 |
| 8,047,945 B2 * | 11/2011 | Wittkopp et al. | 475/219 |
| 8,556,770 B1 * | 10/2013 | Noh et al. | 475/302 |
| 2002/0177500 A1 | 11/2002 | Bowen | |
| 2006/0142111 A1 * | 6/2006 | Park | 475/269 |
| 2009/0082158 A1 * | 3/2009 | Wittkopp et al. | 475/218 |
| 2009/0082160 A1 * | 3/2009 | Phillips et al. | 475/218 |
| 2010/0029433 A1 * | 2/2010 | Tenberge | 475/219 |
| 2010/0062893 A1 * | 3/2010 | Antonov | 475/275 |

FOREIGN PATENT DOCUMENTS

| | | |
|---|---|---|
| JP | 58-109750 A | 6/1983 |
| KR | 10-1181897 B1 | 9/2012 |
| KR | 10-1241167 B1 | 3/2013 |

* cited by examiner

*Primary Examiner* — Justin Holmes (74) *Attorney, Agent, or Firm* — Morgan, Lewis & Bockius LLP (57) ABSTRACT

An automated manual transmission for a vehicle includes an input shaft and an output shaft disposed parallel to each other, a controller and a plurality of external gear trains, planetary gear devices and friction elements. Each external gear train comprises two external gears coaxially and respectively provided on the input and output shafts, and selectively engaged with each other to form a series of gear stages. Each planetary gear device selectively connects one of the two external gears in a corresponding external gear train such that a state of transmitting rotating force to a shaft, on which the selected external gear is provided, can be changed. Each friction element controls rotation of a rotational element of a corresponding planetary gear device. The controller controls the friction elements in accordance with driving conditions of the vehicle, thereby shifting the gear stages.

10 Claims, 5 Drawing Sheets

Fig. 5 though the invention(s) will be described in conjunction
AUTOMATED MANUAL TRANSMISSION FOR VEHICLE

CROSS REFERENCE TO RELATED APPLICATION

The present application claims priority of Korean Patent Application Number 10-2013-0068169 filed on Jun. 14, 2013, the entire contents of which application are incorporated herein for all purposes by this reference.

BACKGROUND OF INVENTION

1. Field of Invention

The present invention relates generally to transmissions for vehicles, and more particularly, to an automated manual transmission.

2. Description of Related Art

Automated manual transmissions can automatically shift gears using actuators during the driving of vehicles, thus providing convenience in the same manner as that of automatic transmissions. Moreover, such an automated manual transmission has superior power transmission efficiency to that of the typical automatic transmission, thereby contributing to improvement in fuel efficiency of a vehicle.

However, in the case of an automated manual transmission based on a synchromesh type of gear shifting mechanism, a moment at which transmission of power is interrupted occurs while shifting gears automatically using actuators. The interruption of power induces a reduction in torque, thus causing a phenomenon of deterioration of gear shift sensation like the vehicle being pulled rearwards.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made to solve at least some of the above problems occurring in the prior art. Various aspects of the present invention provide for an automated manual transmission for a vehicle which is configured such that, despite maintaining a continuous gear engagement method of the conventional manual transmission, a phenomenon of a reduction in torque transmitted to a drive wheel while shifting gears is prevented, whereby a problem of deterioration in gear shift sensation can be avoided such that smooth and reliable gear shift sensation can be maintained, thus enhancing marketability of the vehicle.

Various aspects of the present invention provide for an automated manual transmission for a vehicle, including: an input shaft and an output shaft disposed parallel to each other; a plurality of external gear trains, each comprising at least two external gears that are coaxially provided on the input and output shafts, respectively, and engaging with each other to form one of a series of gear stages; a plurality of planetary gear devices, each connecting either of the two external gears in a corresponding external gear train such that a state of transmitting rotating force to a shaft, on which the selected external gear is provided, can be changed; a plurality of friction elements, each provided to control rotation of a rotational element of a corresponding planetary gear device in the plurality of the planetary gear devices; and a controller controlling the friction elements in accordance with driving conditions of the vehicle, thereby shifting the gear stages.

An automated manual transmission for a vehicle according to the present invention is configured such that, despite maintaining a continuous gear engagement method of the conventional manual transmission, a phenomenon of a reduction in torque transmitted to a drive wheel while shifting gears is prevented, whereby a problem of deterioration in gear shift sensation can be avoided such that smooth and reliable gear shift sensation can be maintained, thus enhancing marketability of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIGS. 1 through 5, an automated manual transmission for a vehicle according to various embodiments of the present invention includes an input shaft INPUT and an output shaft OUTPUT disposed parallel to each other, a plurality of external gear trains, a plurality of planetary gear devices, a plurality of friction elements, and a controller. Each of the external gear trains comprises at least two external gears that are coaxially provided on the input and output shafts, respectively, and engaging with each other to form one of a series of gear stages. Each of the planetary gear devices connects either of the two external gears in a corresponding external gear train such that a state of transmitting rotating force to a shaft, on which the selected external gear is provided, can be changed. Each of the friction elements is provided to control rotation of a rotational element of a corresponding planetary gear device in the plurality of the planetary gear devices. The controller controls the friction elements in accordance with driving conditions of the vehicle, thereby shifting the gear stages.

The input shaft INPUT is directly connected to an engine which is a kind of power source, and the output shaft OUT- PUT is directly connected to a differential DF of the vehicle by a power transmission element so that power can be transmitted to drive wheel W.

In the above-mentioned construction, unlike the conventional technique, a separate clutch is not provided on a path along which power is transmitted from the engine to the input shaft INPUT. Therefore, the number of parts and the entire length of the transmission can be reduced.

Figure 1:
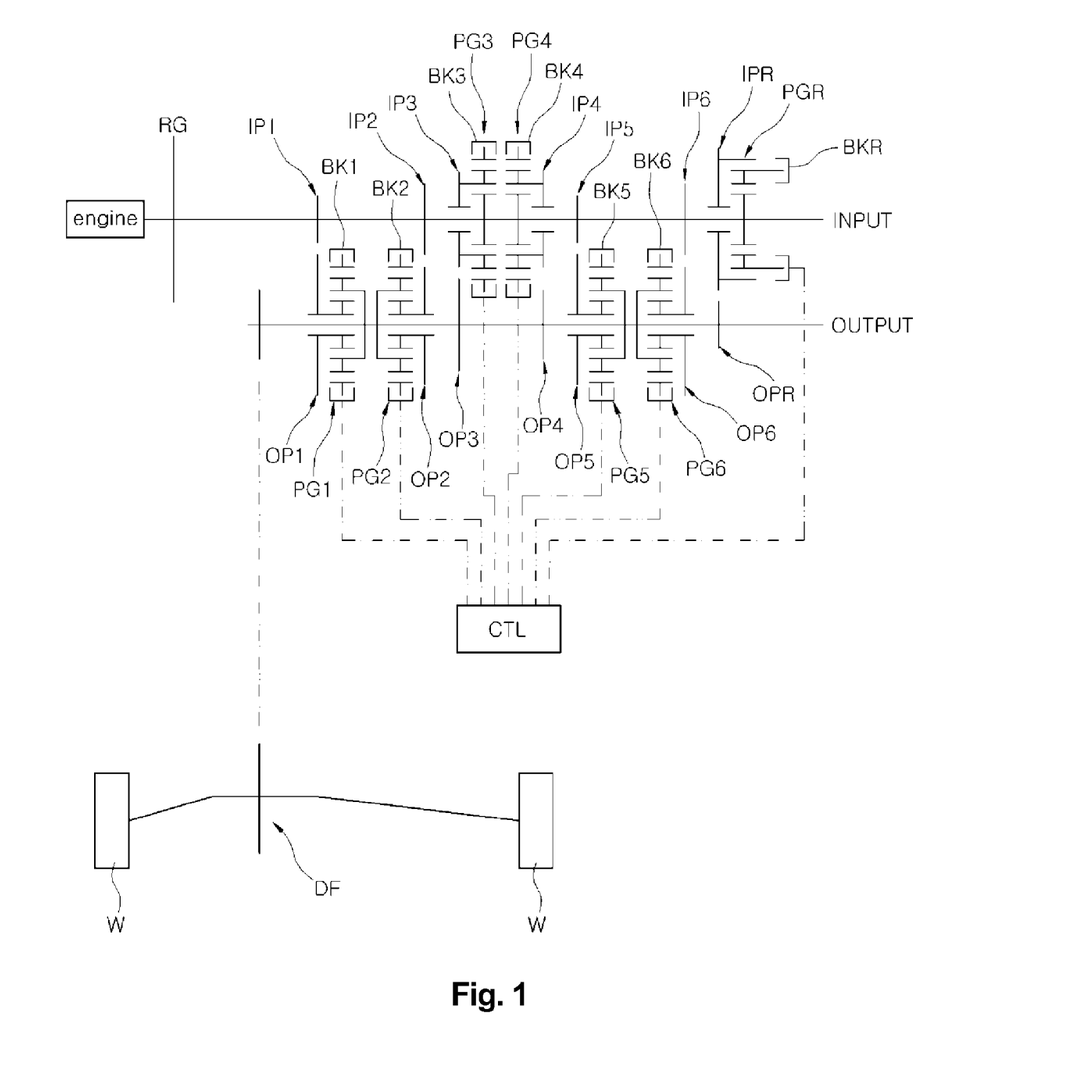
FIG. 1 is a view illustrating the construction of an automated manual transmission for vehicles, according to the present invention.

The reason that start of the engine is possible without having a separate clutch between the engine and the input shaft INPUT is because of the fact that the transmission of the present invention is configured such that power can be independently controlled at each of the gear stages of the transmission by the corresponding planetary gear device, wherein if the engine starts in the state of FIG. 1, when the friction elements that are provided to limit the rotating elements of the planetary gear devices are in released states, even if the drive wheel W and the output shaft OUTPUT are in fixed states, the input shaft INPUT and the output shaft OUTPUT are rotated relative to each other by the planetary gear devices.

In lieu of the engine which is an internal combustion engine, other devices such as an electric motor for providing rotating force may be used as the power source.

In this embodiment, each planetary gear device comprises a simple planetary gear device which includes three rotating elements. One of the three rotating elements is provided on the corresponding external gear with restriction in rotation relative to each other. Another rotating element is provided on the input shaft INPUT or the output shaft OUTPUT with restriction in rotation relative to each other. The other rotating element is configured such that rotation thereof is controlled by the friction element.

In detail, as shown in FIG. 1, each of the planetary gear devices provided on the output shaft OUTPUT includes a carrier which is connected to the output shaft OUTPUT, a sun gear which is connected to the corresponding external gear, and a ring gear which is connected to the corresponding friction element. Each of the planetary gear devices provided on the input shaft INPUT includes a sun gear which is connected to the input shaft INPUT, a carrier which is connected to the corresponding external gear, and a ring gear which is connected to the corresponding friction element.

Furthermore, of the planetary gear devices provided on the input shaft INPUT, the planetary gear device that forms a reverse gear stage is configured such that a reverse external gear which is rotatably provided on the input shaft INPUT is connected to the ring gear of the planetary gear device for the reverse gear stage with restriction in rotation relative to each other, the sun gear of the planetary gear device for the reverse gear stage is connected to the input shaft INPUT with restriction in rotation relative to each other, and rotation of the carrier of the planetary gear device for the reverse gear stage is controlled by the corresponding friction element. Thus, the planetary gear device that forms the reverse gear stage changes the direction of rotation of the input shaft INPUT to the opposite direction before transmitting the rotating force of the input shaft INPUT to the output shaft OUTPUT. The planetary gear device itself conducts a gear shifting operation of determining whether the reverse gear stage is formed or not, a deceleration operation, and a reversing operation of changing the direction of rotation. Compared to the conventional typical transmission which forms a reverse gear stage with a triaxis structure including a separate idle gear, the present invention is more compact and strong and has improved operability.

In various embodiments, among a series of gear stages, the planetary gear devices which form two adjacent gear stages form a pair and are alternately disposed on the input shaft INPUT and the output shaft OUTPUT. Planetary gear devices that respectively form a lowest speed gear stage which has a largest reduction gear ratio and a gear stage which is adjacent to the lowest speed gear stage are provided on the output shaft OUTPUT.

Although the planetary gear devices which form gear stages may be arranged such that adjacent gear stages do not form a pair, they may be arranged in the above-mentioned manner in consideration of ease of assembly and arrangement balance of the transmission.

Furthermore, among a series of gear stages, the planetary gear devices which form the lowest speed gear stage which has the largest reduction gear ratio and the gear stage which is adjacent to the lowest speed gear stage are configured such that the sun gear and the external gear are connected to each other while being restricted in rotation relative to each other, the carrier is connected to the output shaft OUTPUT while being restricted in rotation relative to each other, and the rotation of the ring gear is controlled by the friction element.

In other words, to embody the first gear stage that is a gear stage which has the largest reduction gear ratio, a first planetary gear device PG1 is disposed on the output shaft OUTPUT. In first-gear-stage external gears IP1 and OP2, the sun gear of the planetary gear device PG1 is connected to the external gear OP1 that is installed on the output shaft OUTPUT so as to be relatively rotatable, and the carrier thereof is connected to the output shaft OUTPUT. Thus, after reduction of speed is primarily conducted between the external gear IP 1 and the external gear OP 1, additional reduction of speed is conducted on the first-gear-stage planetary gear device PG1. Therefore, despite minimizing the size of the external gear OP 1, a satisfactory reduction gear ratio can be achieved, whereby the weight and the volume of the transmission can be reduced.

For reference, the planetary gear devices of this embodiment includes the first planetary gear device PG1 of the first gear stage, a second planetary gear device PG2 of the second gear stage, a third planetary gear device PG3 of the third gear stage, a fourth planetary gear device PG4 of the fourth gear stage, a fifth planetary gear device PG5 of the fifth gear stage, a sixth planetary gear device PG6 of the sixth gear stage, and a reverse planetary gear device PGR. The external gears which form the gear stages along with the planetary gear devices include the first-gear-stage external gears IP 1 and OP1, second-gear-stage external gears IP2 and OP2, third-gear-stage external gears IP3 and OP3, fourth-gear-stage external gears IP4 and OP4, fifth-gear-stage external gears IP5 and OP5, sixth-gear-stage external gears IP6 and OP6 and reverse-gear-stage external gears IPR and OPR which are respectively provided on the input shaft INPUT and the output shaft OUTPUT.

Furthermore, for the sake of clear explanation, the friction elements are referred to as a first brake BK1, a second brake BK2, a third brake BK3, a fourth brake BK4, a fifth brake BK5, a sixth brake BK6 and a reverse brake BKR which respectively correspond to the planetary gear devices for the gear stages.

The operation of various embodiments of the present invention having the above-mentioned construction will be described below.

The engine starts in the state of FIG. 1. In this state, all the friction elements are released by the controller CTL. Even if the input shaft INPUT is rotated after the start of the engine, the rotating force of the input shaft INPUT is absorbed to the planetary gear devices rather than being transmitted to the output shaft OUTPUT.

That is, in this state, with regard to each planetary gear device, the rotating element that is restricted in rotation relative to the output shaft OUTPUT is maintained in the stationary state, and even when rotating force is applied to the rotating element that is restricted in rotation relative to the input shaft INPUT, the other rotating element that is in a state of being capable of rotating from the friction element rotates without load and absorbs the rotating force. Thus, the rotating force is not transmitted to the rotating element that is connected to the output shaft OUTPUT.

Therefore, it is possible for the engine to start without a separate clutch between the engine and the input shaft INPUT. Because neither the clutch nor a clutch actuator is required, the structure of the automated manual transmission is simplified, and the length thereof is reduced. Thereby, the installation of the automated manual transmission in the vehicle and the gearshift control of the transmission can be facilitated.

For reference, a ring gear RG which is disposed adjacent to the engine refers to a gear used to start the engine.

Figure 2:
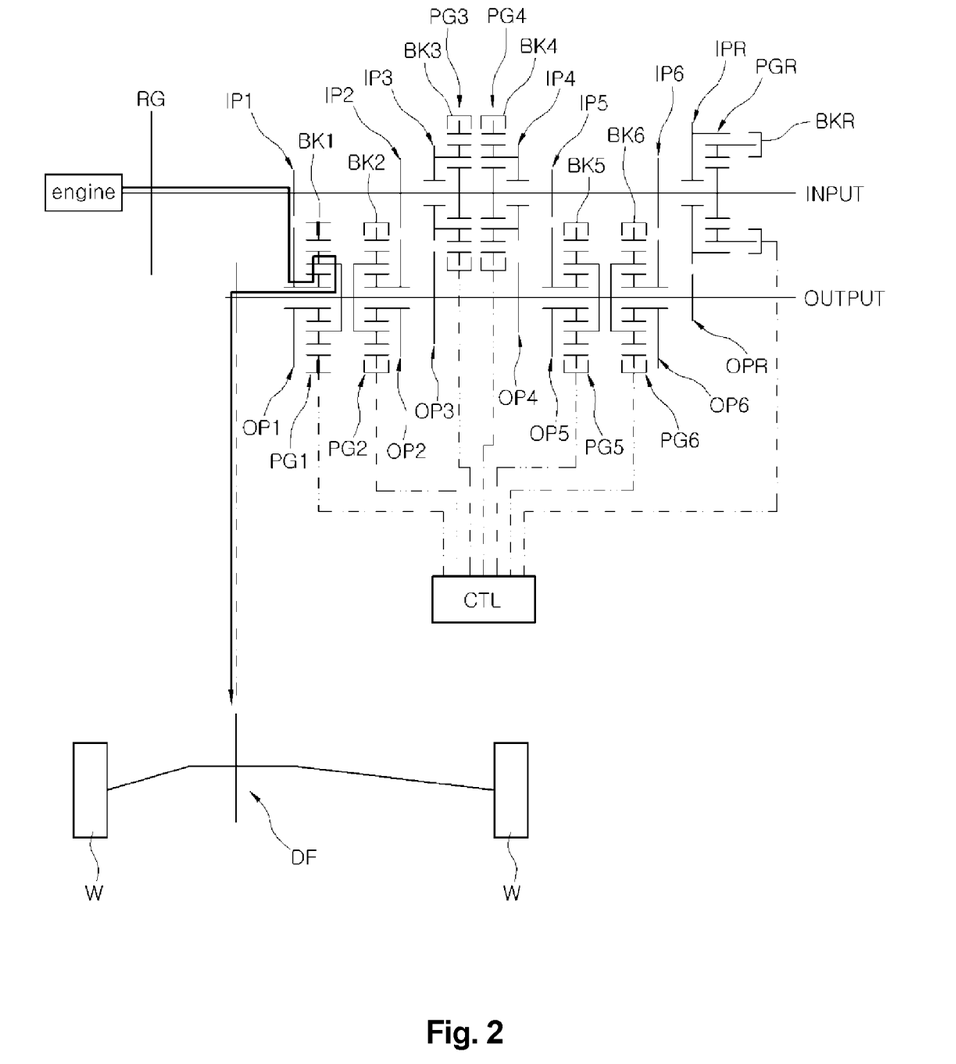
FIG. 2 is a view illustrating a state of the transmission of FIG. 1 when the vehicle starts in first gear and is driving.

FIG. 2 illustrates a state of the transmission when the vehicle starts and is driving in first gear. The controller CTL instructs the first brake BK1 to restrict the rotation of the ring gear of the first planetary gear device PG1 so that the rotating force applied to the input shaft INPUT is successively reduced in speed by the first-gear-stage external gears IP1 and OP1 and the first-gear-stage planetary gear device PG1, thus forming a first gear ratio. In each of the other gear stages, in the same manner, the corresponding planetary gear device absorbs a difference in speed between the input shaft INPUT and the output shaft OUTPUT.

Figure 3:
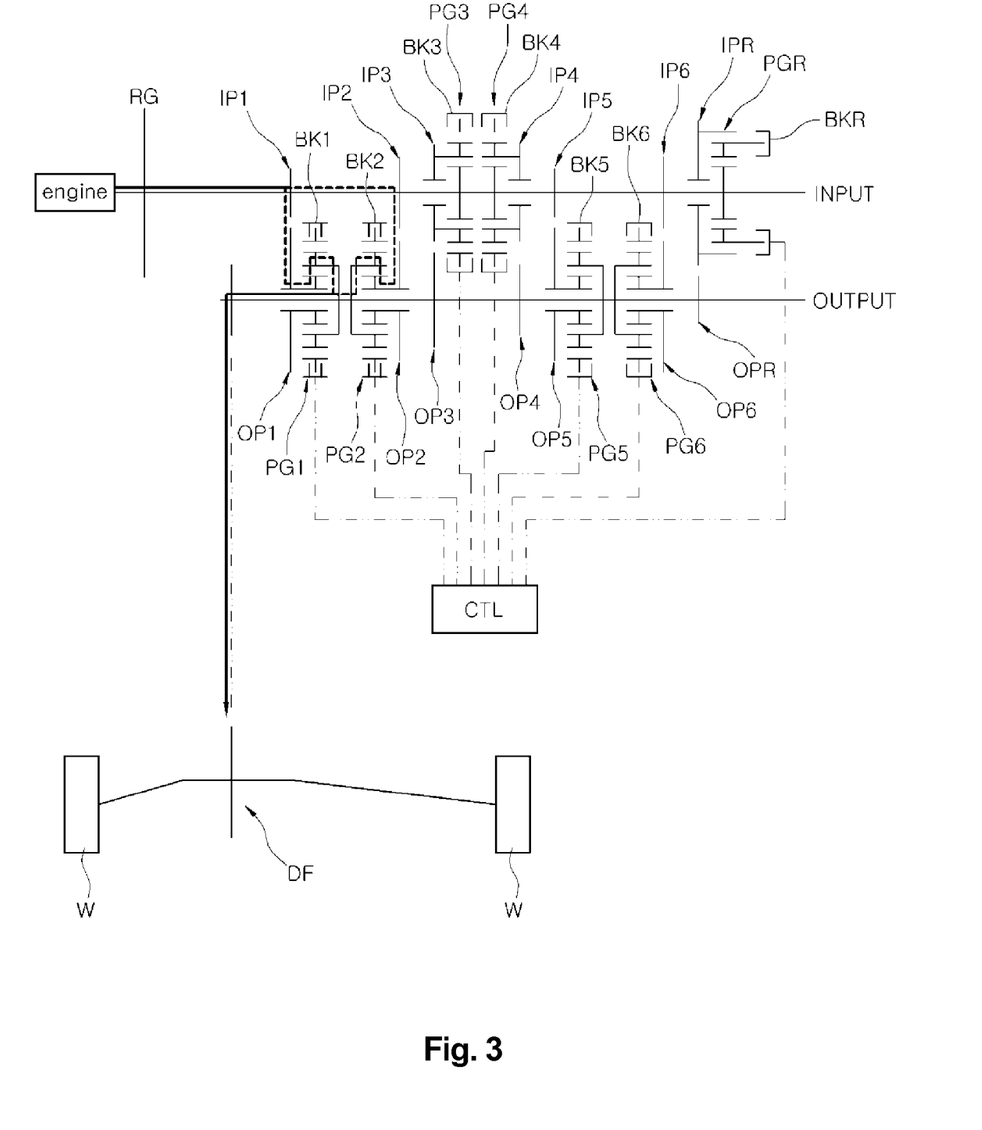
FIG. 3 illustrates a state of the transmission of FIG. 1 when shifting from first gear to second gear.

FIG. 3 illustrates a process of shifting from first gear to second gear. The controller CTL releases the first brake BK1 that has restricted the ring gear of the first planetary gear device PG1 and simultaneously instructs the second brake BK2 to restrict the ring gear of the second planetary gear device PG2 of the second gear stage.

Here, of the ring gears of the two planetary gear devices, the ring gear of the first gear stage is gradually released while the ring gear of the second gear stage is gradually restricted. Such rotation states of the ring gears are precisely controlled by a slip control method. In this slip control section, power is transmitted from the input shaft INPUT to the output shaft OUTPUT through two paths at the same time so that a sense of torque interruption can be prevented from occurring, unlike the conventional technique. Compared to the conventional technique in which gears are shifted by successively controlling the synchronizer and the clutch, the amount of time it takes to shift gears can be reduced because only slip rates of the two ring gears are controlled in such a way that the two brakes BK1 and BK2 are alternately operated.

Figure 4:
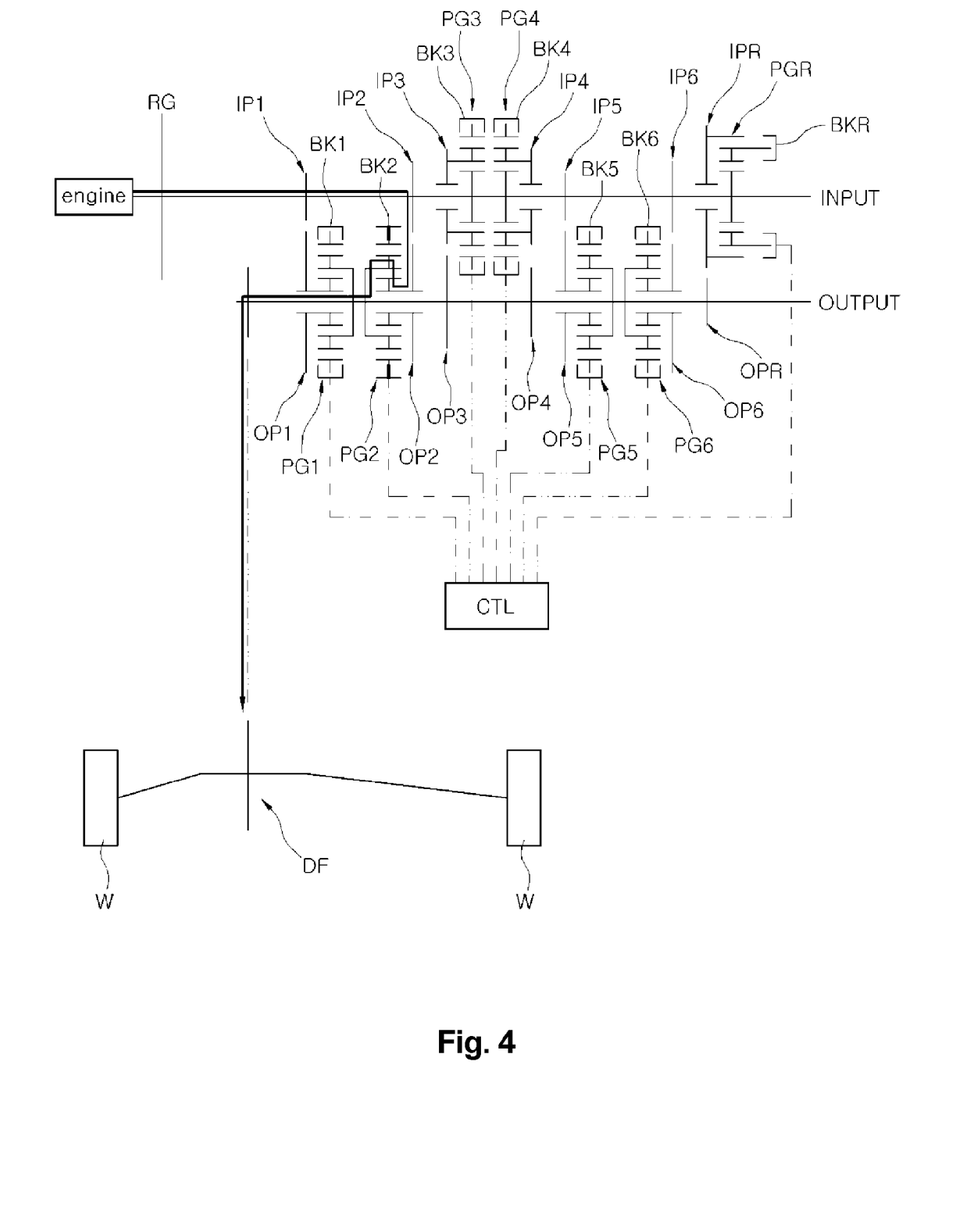
FIG. 4 is a view illustrating a state of the transmission of FIG. 1 when the vehicle is driving in second gear.

When shifting gears from first gear to second gear is completed, as shown in FIG. 4, the transmission enters a second-gear-stage driving state. In this state, the ring gear of the second planetary gear device PG2 of the second gear stage is fixed by the brake BK2 so that the rotating force supplied from the input shaft INPUT is reduced in speed via the sun gear and the carrier of the planetary gear device through the second-gear-stage external gears IP2 and OP2 before being transmitted to the output shaft OUTPUT.

The principle of gear shifting control not only between the second gear stage and the third gear stage but also between other gear stages is the same as that of the gear shifting control between the first gear stage and the second gear stage.

Figure 5:
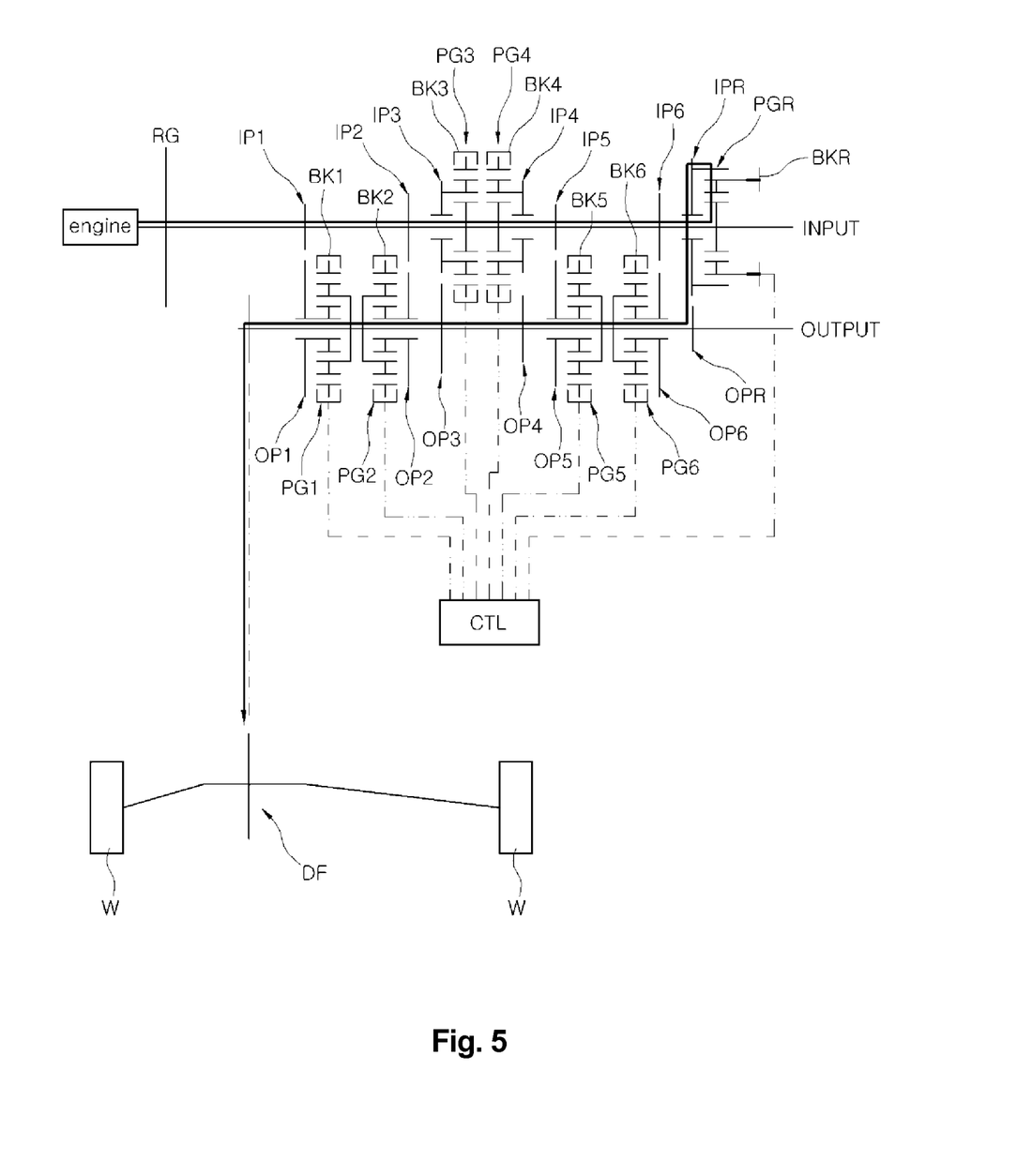
FIG. 5 is a view illustrating a state of the transmission of FIG. 1 when the vehicle is driving in reverse gear.

FIG. 5 is a view illustrating a state of the transmission when the vehicle is driving in reverse gear. In this state, because the carrier of the planetary gear device PGR of the reverse gear stage is fixed by the reverse brake BKR, the rotating force of the input shaft INPUT is transmitted to the sun gear, and the direction of the rotation is reversed by the ring gear, before the rotating force is transmitted to the output shaft OUTPUT through the reverse-gear-stage external gears IPR and OPR, thus forming the reverse gear stage.

As described above, the reverse gear stage of the present invention can be embodied merely by controlling the reverse brake BKR so that the reverse gear shift sensation is superior, and because a separate reverse idler gear is not required, compact, reliable and smooth operability can be provided.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An automated manual transmission for a vehicle, comprising:
    an input shaft and an output shaft disposed parallel to each other;
    a plurality of external gear trains, each comprising at least two external gears that are coaxially provided on the input and output shafts, respectively, and engaging with each other to form one of a series of gear stages;
    a plurality of planetary gear devices, each connecting one of the at least two external gears in a corresponding external gear train, to one shaft of the input shaft or the output shaft such that a state of transmitting rotating force to the one shaft on which the one of the at least two external gears is provided, can be changed, wherein the one of the at least two external gears is relatively rotatable with respect to the one shaft;
    a plurality of friction elements, each provided to control rotation of a rotational element of a corresponding planetary gear device in the plurality of the planetary gear devices; and
    a controller controlling the friction elements in accordance with driving conditions of the vehicle, thereby shifting the gear stages,
    wherein another of the at least two external gears in each of the external gear trains is fixedly connected with another of the input shaft or the output shaft.

2. The automated manual transmission as set forth in claim 1, wherein one or each planetary gear device comprises a simple planetary gear device having three rotating elements, wherein
    one rotating element is provided on the selected external gear with restriction in rotation relative to each other,
    another rotating element is provided on the input shaft or the output shaft with restriction in rotation relative to each other, and
    the other rotating element is configured such that rotation thereof is controlled by the respective friction element.

3. The automated manual transmission as set forth in claim 2, wherein planetary gear devices that form two adjacent gear stages in the series of gear stages form a pair and adjacent pairs are alternately disposed on the input shaft and the output shaft, and the planetary gear devices that respectively form a lowest speed gear stage that has a largest reduction gear ratio and a gear stage that is adjacent to the lowest speed gear stage are provided on the output shaft.

4. The automated manual transmission as set forth in claim 3, wherein the planetary gear devices which respectively form the lowest speed gear stage and the gear stage that is adjacent to the lowest speed gear stage are configured such that a sun gear and the corresponding external gear are connected to each other with restriction in rotation relative to each other, a carrier is connected to the output shaft while being restricted in rotation relative to each other, and rotation of a ring gear is controlled by the corresponding friction element.

5. The automated manual transmission as set forth in claim 3, wherein, to embody a reverse gear stage,
an external gear for a reverse gear stage is provided on the input shaft to be rotatable relative to the input shaft and is connected to a ring gear of a planetary gear device for the reverse gear stage with restriction in rotation relative to each other,
a sun gear of the planetary gear device for the reverse gear stage is connected to the input shaft with restriction in rotation relative to each other, and
rotation of a carrier of the planetary gear device for the reverse gear stage is controlled by the corresponding friction element.

6. The automated manual transmission as set forth in claim 1, wherein the input shaft is directly connected to a power source, and the output shaft is directly connected to a differential of the vehicle by a power transmission element.

7. An automated manual transmission for a vehicle, comprising:
an input shaft and an output shaft disposed parallel to each other;
a plurality of external gear trains, each comprising at least two external gears that are coaxially provided on the input and output shafts, respectively, and engaging with each other to form one of a series of gear stages;
a plurality of planetary gear devices, each connecting either of the two external gears in a corresponding external gear train such that a state of transmitting rotating force to a shaft, on which the selected external gear is provided, can be changed;
a plurality of friction elements, each provided to control rotation of a rotational element of a corresponding planetary gear device in the plurality of the planetary gear devices; and
a controller controlling the friction elements in accordance with driving conditions of the vehicle, thereby shifting the gear stages,
wherein one or each planetary gear device comprises a simple planetary gear device having three rotating elements, wherein
one rotating element is provided on the selected external gear with restriction in rotation relative to each other,
another rotating element is provided on the input shaft or the output shaft with restriction in rotation relative to each other, and
the other rotating element is configured such that rotation thereof is controlled by the respective friction element,
wherein planetary gear devices that form two adjacent gear stages in the series of gear stages form a pair and adjacent pairs are alternately disposed on the input shaft and the output shaft, and
the planetary gear devices that respectively form a lowest speed gear stage that has a largest reduction gear ratio and a gear stage that is adjacent to the lowest speed gear stage are provided on the output shaft, and
wherein the planetary gear devices which respectively form the lowest speed gear stage and the gear stage that is adjacent to the lowest speed gear stage are configured such that a sun gear and the corresponding external gear are connected to each other with restriction in rotation relative to each other, a carrier is connected to the output shaft while being restricted in rotation relative to each other, and rotation of a ring gear is controlled by the corresponding friction element.

8. The automated manual transmission as set forth in claim 7, wherein the input shaft is directly connected to a power source, and the output shaft is directly connected to a differential of the vehicle by a power transmission element.

9. An automated manual transmission for a vehicle, comprising:
an input shaft and an output shaft disposed parallel to each other;
a plurality of external gear trains, each comprising at least two external gears that are coaxially provided on the input and output shafts, respectively, and engaging with each other to form one of a series of gear stages;
a plurality of planetary gear devices, each connecting either of the two external gears in a corresponding external gear train such that a state of transmitting rotating force to a shaft, on which the selected external gear is provided, can be changed;
a plurality of friction elements, each provided to control rotation of a rotational element of a corresponding planetary gear device in the plurality of the planetary gear devices; and
a controller controlling the friction elements in accordance with driving conditions of the vehicle, thereby shifting the gear stages,
wherein one or each planetary gear device comprises a simple planetary gear device having three rotating elements, wherein
one rotating element is provided on the selected external gear with restriction in rotation relative to each other,
another rotating element is provided on the input shaft or the output shaft with restriction in rotation relative to each other, and
the other rotating element is configured such that rotation thereof is controlled by the respective friction element,
wherein planetary gear devices that form two adjacent gear stages in the series of gear stages form a pair and adjacent pairs are alternately disposed on the input shaft and the output shaft, and
the planetary gear devices that respectively form a lowest speed gear stage that has a largest reduction gear ratio and a gear stage that is adjacent to the lowest speed gear stage are provided on the output shaft, and
wherein, to embody a reverse gear stage,
an external gear for a reverse gear stage is provided on the input shaft to be rotatable relative to the input shaft and is connected to a ring gear of a planetary gear device for the reverse gear stage with restriction in rotation relative to each other,
a sun gear of the planetary gear device for the reverse gear stage is connected to the input shaft with restriction in rotation relative to each other, and
rotation of a carrier of the planetary gear device for the reverse gear stage is controlled by the corresponding friction element.

10. The automated manual transmission as set forth in claim 9, wherein the input shaft is directly connected to a power source, and the output shaft is directly connected to a differential of the vehicle by a power transmission element.

* * * * *